July 26, 1932. A. THOMA 1,868,927
SHOE BOTTOM FILLER
Filed Sept. 27, 1929

Inventor:
Andrew Thoma,
by Roberts Cushman & Woodbury
Attys.

Patented July 26, 1932

1,868,927

UNITED STATES PATENT OFFICE

ANDREW THOMA, OF CAMBRIDGE, MASSACHUSETTS, ASSIGNOR TO NORTH AMERICAN CHEMICAL COMPANY, OF CAMBRIDGE, MASSACHUSETTS, A CORPORATION OF MASSACHUSETTS

SHOE-BOTTOM FILLER

Application filed September 27, 1929. Serial No. 395,664.

My present invention is shoe-bottom filler, preferably in the form of a piece although also well adapted to bulk form and so claimed, as well as in piece form, in which the filler contains in whole or in part ingredients responsive only to high heat as distinguished from the filler heretofore commonly employed which required low heat.

My present filler is composed in whole or in part of such hard high-heat-responsive binder ingredients as the hard hydrocarbons, rosin, resin gums, asphalts, bituminous materials and the like. Because of the high melting point of the materials just mentioned, a filler mixture of body material and these asphalts and the like of 180°–200° melting point or higher could not be used in mass in a kettle or usual filler apparatus as now done with present plastic fillers because it would expose the operator to an unbearable heat and with conditions absolutely impossible for him to endure day after day in his regular work in the shoe factory. The heat and the greater muscular force which would be necessary in preparing, applying and manipulating the same in the usual hand operations, renders the use of such materials impossible by the old construction and method. Also because of the strong tendency of such binder to smooth, stain and cling (to the laying tool) it was impracticable and in fact impossible to use this clinging, smoothing asphalt or bituminous hydrocarbon in the old form of bulk filler or mass filler.

My present invention makes it not only possible but easy and extremely advantageous to employ these high melting point ingredients in old form of bulk filler or mass filler. The new filler, which constitutes my invention as covered by the present application, is so constructed that it can readily be used in mass in a kettle or usual filler apparatus and the use of my new filler does not expose the operator to the greater muscular effort, and to an unbearable heat etc. as heretofore, as above explained. Two principal novel features (but carried out variously if desired) make the foregoing possible. The filler construction permits, in the first place, the conditioning and softening of the filler for preliminary positioning in the shoe-bottom cavity independently of the high heat requirements or character of the hard hydrocarbons present. In the second place, the new filler construction does not necessarily require any heat treatment of said hard hydrocarbon element or elements until after the aforesaid preliminary positioning of the softened filler mass in the shoe-bottom cavity, and then it requires merely a fleeting, or sudden, momentary, or instant heat application, by a very high heat which melts, flows, spreads and fluxes the aforesaid hydrocarbon elements in the one sudden and preferably only heat treatment thereof. In other words my invention is a spreadable shoe-bottom filler requiring the use of a sudden high heat for its conditioning in the shoe-bottom cavity, a heat higher than heretofore possible with previous plastic or spreadable fillers without charring the body material. Preferably my new filler is amenable to low heat for its preliminary spreading function and requires high heat for its final spreading and preferably requires the aforesaid sudden high heat application to be applied to the filler when the latter has already been placed in the shoe-bottom cavity. I employ in the form of body material any of the aforesaid hard binder ingredients in dry and preferably comminuted condition and preferably along with other usual woody or comminuted fibrous body material such as ground cork or other inert or woody matter. This is in distinction from employing the hard hydrocarbon or other high melting point binder material in fluid form when the filler is made. In the latter case, i. e. having the natural asphalt or other high-heat responsive binder element fluxed and then mixed with body material, sheeted, cooled and packaged, the whole sheet or product is hard and would require such a high-melting heat to become spreadable as to be highly objectionable to the shoe-filling operative. But by employing said natural asphalt or other binder capable of being powdered or comminuted, such as any resinous or bituminous material which is naturally brittle or made so artificially and employing the same in an unfused state and with a low melting point binder the aforesaid objection is eliminated. The result is that the filler piece becomes easily spreadable with a low heat the same as if the high-heat-responsive unfused material were not present, and hence is easily spread and manipulated by the operative, who needs only, therefore, to use momentary high heat for the little chunks or particles of high melting point material here and there, especially such as are in the surface, resulting from and as met with in the spreading operation of the shoe bottom filling action. For example, the operator spreads the filler piece with ease by means of the usual hot roll because he has simply the easily responsive low melting binder to overcome, and this ease and quickness of spreading is enhanced by having an extra high heat in the spreading roll. Said extra-hot roll simultaneously fuses and blends with the softer mixture such particles of hard asphalt or the like as are directly contacted with by the extra-hot roll in the changing surface of filler as the piece, or mass, is rolled out or flowed and spread. Preferably the woody or comminuted fibrous portion, if any, of the body material is first soaked in hot water, soluble oil, soap solution, or the like, and then these body particles are individually enveloped in a thin coating of any of the soft or low-melting point hydrocarbons or the like already mentioned. The preliminary soaking of the fibrous body-material is to conduce to ultimate lightness by first swelling or distending the cork and then interposing therein this barrier to prevent the otherwise inevitable soaking of the cork or loading thereof with the heavy, sluggish soft wax tailings. Also the oiled or soluble-oil-containing cork or other absorbent body material is more lively, resilient, tough, more easily spread, more easily conditioned (because more readily absorbent or responsive to steam or to melted binder, even if sealed) than natural or dry cork (untreated) which is dead, dry, brittle, etc. Still further life, resilience and lightness is preferably secured by fixing the soapy solution or the like in the cork permanently, which may be done by introducing any reacting agent such as a preferably weak solution of sulphate of aluminum. The reacting agent precipitates the soluble fatty acid radical such as the soap solution, into an insoluble aluminum stearate. Having thus treated the fibrous body material, the body particles are then enveloped as stated with, for example, soft wax tailings. Before this mixture has hardened or set, and while it is still soft I preferably blow thereon finely comminuted hard binder material such as the asphalt, hydrocarbons and the like already mentioned. This forms the double office of constituting a dulling powder to reduce the mass quickly to a dough-like stability and also it introduces the high melting point element already explained. Before, however, combining the elements in this manner the cork, preferably treated for resilience and lightness as explained, is mixed with high melting point hydrocarbons in such a manner as to individually envelop the separate body particles with an exceedingly thin film thereof, this being accomplished while said particles are agitated so as to give the thin film coverings a chance to set without sticking them solidly together. The body material now consists of two portions, one portion of which is the finely ground woody or mineral matter or other comminuted body material and the other portion of which consists of the hard high melting material in the form of the very thin fine coatings on said particles. This provides a body-material of finely coated particles discrete or distinct and separated, and which is at least partly high-heat-responsive. Then the body material, preferably of this dual character is united into a sticky mass the same as previously described by being mixed with a thin binder covering of very low-melting sticky wax tailings or any of the other strongly sticky and permanently plastic, adhesive and coherent binders mentioned in my various shoe-bottom filler patents and the dulling powder is preferably introduced as before stated. The low melting soft wax tailings is preferred and is in a heated and very fluid condition when being intermixed with the aforesaid body material of coated granules so as to coat said body material particles thinly but yet sufficiently to hold the mass together as a coherent body, capable of being shaped into a commercial parcel for shipping, storing and general handling. The amount of this very soft and easily fluid binder may be largely varied according to the proportion of granular hydrocarbons and the like which are next introduced. Having mixed together the coated fibrous body material and the soft or low melting wax tailings or other soft hydrocarbons, I intermix therewith hard hydrocarbons or other high melting point binder material but not in a melted condition, the same being introduced in the form of dry ground particles or granulations. This granular mass of hard binder material in a wholly unmelted condition or inherently dry, is thoroughly mixed into and throughout the still warm and miscible body of materials which have just been mixed together. Preferably also a dry accelerator is mixed in to promote the fluxing of the two binders in use. The best example (for the types of binders mentioned) is a low-melting coal-tar derivative such as naphthaline, phenol, synthetic resins, etc. in their natural form or powder, rendered active by the filler conditioning heat. The granules of binder material and also the similar coated particles, both still dry, by which term I define their unmelted or unfluxed and separated condition and relation, now occupy the position and function of body material side by side with the other body material through the mass. Under ordinary heat these granules remain inherently dry or unmelted and hence are incapable of acting as binder but only as body material. In other words, as the main binder or low melting constituent, preferably wax tailings, responds readily to low heat, it will be seen that my invention greatly assists at the shoe factory in getting the filler mass soft at the start for use in filling the shoe-bottom cavities. It makes this preliminary softening quick and easy. Likewise it is much easier to spread. Thus it saves time and heat and also labor. Moreover it is of low cost. It is also very light weight or high specific gravity, especially with the extra light treated-cork or other fibrous body material. The feature of light weight is a prominent advantage of my invention. Preferably the cork is first so treated that it retains the high specific gravity by being prevented from soaking up the heavier wax tailings. Then it is preferably swelled and caused to remain so (the stearate treatment), and next an exceedingly thin film of binder is made possible, in fact merely enough to hold the mass together, and finally the chunks or granular mass or hard binder material adds still further to the high specific gravity content of my new shoe bottom filler. The advancing requirements of shoe manufacture and especially of present styles, call for lightness of the plastic or spreadable shoe filler, besides permanency, almost stiffness in fact, when the filler is in its ultimate spread and laid condition in the shoe-bottom cavity of the finished shoe. Therefore the heavy, sticky, soft binder constitutes as slight a proportion of the binder material as possible, just barely sufficient to hold the bulk together. The hard, dry binder material is selected of very light grades. For example certain grades of rosin are lighter in weight or have higher specific gravity than certain grades of cork. I select therefore the light weight binder material and of such a hardness that it can be ground the same as the cork or other inert or woody matter, preferably grinding the two together, or otherwise providing the hard binder material in comminuted form or granulations of the proper size to function as body material and as the latent binder portion of the filler mass, giving both bulk and quality to the structural consistency of the filler commercially and then later in use. Because of the dual capacity of this light weight binder material in my new filler I call the same body-binder. In other words my new filler consists, in its preferrred structure, of body material, body-binder-material, and binder. If preferred, all fibrous body material may be omitted and the entire body material may consist of the hard hydrocarbons of the kind or kinds previously mentioned, preferably of the very light weight variety or varieties. The soft wax tailings or other low melting binder is used for convenience of conditioning, quick and easy spreading, and then the hard hydrocarbons come into operation to speed up the process and quicken the final results and to promote stiffening or produce a final stiff filler layer in the finished shoe, which is incapable of bunching or shifting. Further spreading efficiency is preferably secured by intermixing as a slight separator between the soft wax tailings coated granules a secondary binder consisting of a water dispersed solution of tapioca flour and soap of a pasty consistency. This facilitates sheeting, and especially sheeting between layers of paper, and it promotes stability. It is also advantageous to employ the low melting point binder in a dispersed condition, preferably dispersed in a water solution of soap or in soluble oil. In such case this binder, as well as the separator and the saturated cork may in use, all be appreciably set or fixed by the introduction of or the freeing or rendering active of the reactive agent such as sulphate of aluminum, as previously explained.

While my present invention makes it possible for the first time to employ the hydrocarbons mentioned, such as asphalt, in bulk filler, it will be understood that it may likewise be employed in sheeted form or piece filler. In either case it depends on the coating of latent high-heat-responsive stiffener and also on the latent ground or granulated hard binder to furnish part or all of the necessary volume (body material) and also of the necessary high grade binding quality for the laid mass. The functioning of this latter feature, the high grade binder and stiffener, does not take place until the filler has been actually placed and spread in the shoe-bottom cavity. Then, when the deposited filler has been subjected to a sudden high heat, preferably by a super-heated spreading roll, this momentary extra-melting heat fluxes the hard ground coating and also the particles or granulations of body-binder that the roll comes in contact with and the simultaneous flowing or filler-spreading act, as the operator quickly moves the shoe-bottom back and forth in pressing engagement with the super-hot roll, unites the fluxed or melted material with the unfluxed material throughout the laid filler. The suddenly melted and united ingredients ramify the layer as a stiffener as soon as the high heat is removed. As the super-hot roll flows the filler with its spreading action, the roll comes in contact with more or less of the hard particles throughout the mass, melting the same and fluxing them with the soft binder and causing them to stick likewise to the rest of the body material. By the same means and act the sudden high-heat likewise melts or softens more or less of the hard coatings so far as the super-hot roll contacts with said coatings, and this melting or softening causes said coatings to cooperate with the rest of the melted and fluxed binder to insure positive direct and permanent gripping together of all the body particles into one homogeneous sheet or spread layer of filler throughout the shoe-bottom cavity. The chief reason and advantage of having some or all of the hard binder in the form of the coatings explained, is that thereby there necessarily results, under the softening or melting thereof as just explained, a tenacity of gripping directly between the body particles which is more intimate and sure than would otherwise be possible. This is because the coated binder material is already in as firm gripping union with the body particles as is possible, so that the sudden heat which softens some of said coating material serves simply to stick or unite the coating of one particle to the coating of another particle along with the two particles. The body material consists now of both the woody particles and such portions of their coatings as have not been fused but still remain such and also consists of such of the hard particles of binder material as may not have been fused. This explains my naming this new kind of body material as body-binder material. The particular hard binder that I prefer is blown asphalt. This is a residuum of petroleum of the asphaltic base variety treated until it is substantially saturated with oxygen or at least until its character is changed into permanent flexibility or pliability so as to eliminate its natural brittleness by becoming toughened by oxygenating treatment to the extent known by the name in the trade of blown asphalt. I have found this material has remarkable and unexpected advantages in carrying out my invention. A shoe bottom filler piece made with this blown asphalt is non-sticky externally as an article of manufacture, softens and readily becomes spreadable, and, under the sudden high heat treatment explained, becomes permanently pliable when thus laid in the shoe bottom, never becomes liable to bunch, is very strongly adherent to leather, so that the blown asphalt layer can never shift in the shoe bottom, is not responsive so as to soften under any heat to which the shoe would be exposed in use, is tough and durable beyond the ordinary life of the shoe, needs no backer and strengthening element as a filler component within or on the piece, is cheap, without waste in manufacture and use, and is always clean.

As already stated, my present invention is radically novel in permitting the postponing, subsequent to the commercial manufacture of the shoe bottom filler, of the fluxing of the binder elements and hence in bringing about later, after the filler has been made and shipped, this fluxing or fusing of the high melting hydrocarbon at a time when all that is desired is to overcome the more brittle nature thereof and blend the same as a stiffener with the lower melting binder ingredients and under conditions as to heat, speed and ease, which do not tend to overtax the operative.

In the drawing in which I have illustrated my invention,

Figure 1:
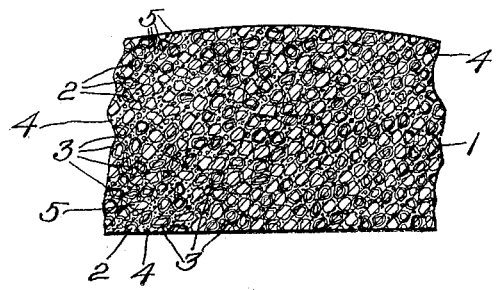
Fig. 1 is a cross sectional view of a mass of my new bulk filler the solid particles therein being enlarged in order to make the invention more clearly understood.
Figure 2:
Fig. 2 is a similar sectional view of the embodiment of my invention in the form of a standardized sheeted piece, as an article of manufacture.
Figure 3:
Fig. 3 is a greatly magnified or enlarged particle of comminuted cork shown in section to exhibit the thin film coating or covering thereof.

As my present filler invention may be carried out in the form of bulk filler or standardized piece filler, I have illustrated both embodiments in Figs. 1–3 respectively, Fig. 1 showing a bulk or mass 1 of the filler in which some of the cork or other usual body material particles 2 are provided with coatings 3 of dry body-binder material and all united into said mass 1 by binder material 4, preferably of soft wax tailings, and preferably powdered binder, and/or tapioca-soap paste. Additional body binder is embedded so far as possible throughout the mass in the form of particles 5 preferably of varying sizes, just as they come from the grinder or crusher. In Fig. 2 I have shown the same combination of elements excepting that the dry, hard body binder elements 5 predominate in the upper part of the filler, which is shown in the form of a piece 6. This excess of dry body-binder or other meltable crust-forming ingredients 5 at the upper portion of the piece as a stiffener or crust forming layer, is or may be accomplished in the sheeting process of forming the piece. To make the coated particle distinctly visible I have shown the same in Fig. 3 for purposes of illustration greatly enlarged. A granule or comminuted particle 7 of cork is shown having a surrounding film 3 of normally hard and dry high-heat-responsive binder material which I have referred to above as binder-body-material. I have mentioned asphalt materials because they are especially advantageous in many ways. Asphalt can be purchased of a far greater variety than wax tailings and having a higher melting nature, greater tenacity, and flexibility, possessing a denser more viscous body, or in other words they give to the filler mass or piece greater body and binding capacity. Furthermore such a filler is readily sheeted and is naturally stiff and can be installed in a shoe without the usual expensive apparatus, in fact by the use solely of a hot laying tool such as a spatula or roll, provided with high heating means such as is conveniently provided electrically. As already stated the extra lightness is secured by swelling the cork and then preferably fixing it in its swelled condition as by the precipitate mentioned or any other precipitate, there being many other substances for accomplishing the same result, particularly acids used as reacting agents, such as acetic acid, oxalic acids and sulphates such as sulphate of zinc, iron, aluminum, preferably by coating or acting upon the cork saturated with soluble oil, soap solution or other saponified liquids. Preferably a soft precipitate is desired in order not to decrease the resiliency of the cork. The more liquid the saturant is the better it will penetrate the cork or other fibrous matter. The chemical reaction takes place wherever the two come together. Preferably the treatment of the cork is at the beginning or preceding the manufacture of the filler, in order to secure the utmost lightness thereby. In its simplest embodiment, the filler, whether as mass or piece, contains both high melting binder and low melting binder, and the latter may be in direct contact with the uncoated body material or with the coated body-material and the high melting binder be mixed in dry, in comminuted form. Or the coatings may be the sole element for the high-heat feature. In such case, the coating is preferably heavy and, whether the body particles have uniform size or not, the desired evenness may be secured by sieving or forcing the coated particles, slightly warm, through a desired mesh. In other words, if preferred, the spraying or coating of the fine woody particles or other comminuted body-material may be omitted, depending upon the subsequent step of the application of the sudden high heat to unite the particles by means of such of the hard particles of binder as are thereby melted and forced into gripping engagement with the woody particles as the layer is being spread. In such case the comminuted body material, preferably first wetted or soaked, and preferably originally treated as already explained, is united into the desired preliminary sticky mass by being intermixed with the soft or low melting binder, preferably wax tailings, and the hard chunks or particles of hydrocarbon or the like are at once mixed into the sticky mixture until the latter is stiff or doughy the same as before, or the hard binder may be secured sufficiently by a heavier spraying and the introduction of the hard, high-heat particles dry may then be omitted. In all these ways I add a firmer filler mass to a softer filler mass to make the complete shoe-filler. The step of setting the cork, or the precipitation and other cork-treatment previously mentioned, is preferably accomplished before mixing the filler. In fact, it may be long before, and the cork then dried and stored for later use. Or it may be accomplished at the period of mixing, or when filling the shoe-bottom cavity, in which latter case the precipitating agent is contained in the filler in an inactive condition and rendered active by the steaming of the filler for spreading or by the water pressed from the cork, for example, by the spreading roll or by the leveler. Also the requisite chemicals for this setting or fixing treatment, as already explained, may be provided in connection with treating the cork or treating the binder, and in either case the filler may be mixed either before or after the fixing or setting takes place. Certain other phases of this general subject are contained in my applications Ser. No. 336,908 filed Feb. 29, 1929 and Ser. No. 389,872 filed August 31, 1929. Also I point out as a striking novelty, intended to be claimed herein broadly, the feature of having in the filler dry inert material which by extra high heat treatment of the filler is developed into a firming or stiffening member of the final filler If in piece form the outer surface or skin is preferably practically clear binder and is preferably asphalt, even if the piece is mainly of the same low-melting quality as the ordinary slippery, oily, paraffin-base wax tailings, and still more particularly if of the high melting point grade of asphalt and especially if of blown asphalt. In such case the piece has not only an absence of external stickiness before melting but an absence of said slippery character when melted, and has enough tackiness or adhesiveness to cling to the knife or spatula sufficiently to permit rapid laying and spreading by the method of my application Ser. No. 388,320, filed Aug. 26, 1929. The low melting wax tailings gets readily and quickly conditioned for spreading and sticking to the bottom of the cavity, whereas the high-heat-melting element, hard asphalt for example, only responds to the sudden high heat which is preferably applied with pressure at the moment of laying and spreading in the shoe-bottom cavity and is depended upon for producing the stiffening and permanence of position of the filler when once laid in the shoe The melting of each of these two unblended binders is facilitated by the presence of a suitable accelerator or latent solvent intermixed in its comminuted form (i. e. crystals or powder) such as the naphthaline, creosol or the like, as previously explained herein, which, under the conditioning heat of the filler in use, first acts on the binder or binders as a solvent and then as fluxing agent to aid in uniting the two, when both are present and melted, and which finally evaporates or disappears as a solvent. This feature gives the filler a superior rigidity or reluctance to bunch or shift not possible heretofore in plastic or spreadable fillers.

This application is subordinate to my co-pending application Ser. No. 297,630 filed August 6, 1928.

I claim:

1. Shoe bottom filler comprising hard, high heat melting point body binder selected from the group consisting of asphalt, rosin, resin gums, bitumen and hard hydrocarbon, in the form of small, discrete, segregated units in a dry, hard state, mixed but not fused with soft, sticky, cementitious, low heat melting point binder, the mixture as a whole constituting a heat plastic filler mass capable of being sufficiently softened for spreading in a shoe bottom cavity by low heat adapted to soften the soft binder without softening the hard body binder, and the hard body binder being adapted to be softened and blended with the soft binder by the sudden, brief application of high heat.

2. Shoe bottom filler comprising hard, high heat melting point body binder selected from the group consisting of asphalt, rosin, resin gums, bitumen and hard hydrocarbon, in a dry, hard, comminuted state, mixed but not fused with soft, sticky, cementitious, low heat melting point binder, the mixture as a whole constituting a heat plastic filler mass capable of being sufficiently softened for spreading in a shoe bottom cavity by low heat adapted to soften the soft binder without softening the hard body binder, and the hard body binder being adapted to be softened and blended with the soft binder by the sudden, brief application of high heat.

3. Shoe bottom filler comprising comminuted, fibrous, absorbent body material, and hard, high heat melting point body binder selected from the group consisting of asphalt, rosin, resin gums, bitumen and hard hydrocarbon, in the form of small, discrete, segregated units in a dry, hard state, mixed but not fused with soft, sticky, cementitious, low heat melting point binder, the mixture as a whole constituting a heat plastic filler mass capable of being sufficiently softened for spreading in a shoe bottom cavity by low heat adapted to soften the soft binder without softening the hard body binder, and the hard body binder being adapted to be softened and blended with the soft binder by the sudden application of high heat of sufficiently brief duration to avoid burning the fibrous body material.

4. Shoe bottom filler comprising comminuted, fibrous, absorbent body material, and hard, high heat melting point body binder selected from the group consisting of asphalt, rosin, resin gums, bitumen and hard hydrocarbon, in a dry, hard, comminuted state, mixed but not fused with soft, sticky, cementitious, low heat melting point binder, the mixture as a whole constituting a heat plastic filler mass capable of being sufficiently softened for spreading in a shoe bottom cavity by low heat adapted to soften the soft binder without softening the hard body binder, and the hard body binder being adapted to be softened and blended with the soft binder by the sudden, brief application of high heat of sufficiently brief duration to avoid burning the fibrous body material.

5. Shoe bottom filler comprising hard, high heat melting point body binder selected from the group consisting of asphalt, rosin, resin gums, bitumen and hard hydrocarbon, in the form of small, discrete, segregated units in a dry, hard state, mixed but not fused with soft, sticky, cementitious, low heat melting point binder, the mixture as a whole constituting a heat plastic filler mass capable of being sufficiently softened for spreading in a shoe bottom cavity by low heat adapted to soften the soft binder without softening the hard body binder, and the hard body binder being adapted to be softened and blended with the soft binder by the sudden, brief application of high heat and an accelerator adapted to promote the fluxing together of the hard body binder and the soft binder.

6. Shoe bottom filler comprising comminuted, fibrous, body material, the particles of which are coated with hard, high heat melting point binder selected from the group consisting of asphalt, rosin, resin gums, bitumen and hard hydrocarbon, said coated particles being mixed with soft, sticky, low heat melting point binder, the coatings of hard binder being unfused with the soft binder and the mixture as a whole constituting a heat plastic filler mass capable of being sufficiently softened for spreading in a shoe bottom cavity by low heat adapted to soften the soft binder without softening the coatings of hard binder, and the coatings of hard binder being adapted to be softened and blended with the soft binder by the sudden, brief application of high heat.

Signed by me at Cambridge, Massachusetts, this twenty-third day of July, 1929.

ANDREW THOMA.